US008955302B2

United States Patent
Van Straaten et al.

(10) Patent No.: US 8,955,302 B2
(45) Date of Patent: Feb. 17, 2015

(54) FLUSHING THE EXHAUST GAS RECIRCULATION LINES OF A GAS TURBINE

(71) Applicant: Alstom Technology Ltd, Baden (CH)

(72) Inventors: Floris Van Straaten, Eggenwil (CH); Juergen Hoffmann, Untersiggenthal (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 13/783,911

(22) Filed: Mar. 4, 2013

(65) Prior Publication Data

US 2013/0174535 A1  Jul. 11, 2013

Related U.S. Application Data

(63) Continuation of application No. PCT/EP2011/063690, filed on Aug. 9, 2011.

(30) Foreign Application Priority Data

Sep. 2, 2010  (CH) .................................... 01424/10

(51) Int. Cl.
  *F02C 3/34*  (2006.01)
  *F02C 9/18*  (2006.01)
  *F02C 3/13*  (2006.01)

(52) U.S. Cl.
  CPC ... *F02C 3/34* (2013.01); *F02C 9/18* (2013.01); *F02C 3/13* (2013.01)
  USPC .............. 60/39.52; 60/782; 60/39.5; 60/785; 60/39.182

(58) Field of Classification Search
  CPC ................. F02C 3/34; F02C 3/13; F02C 9/18
  USPC .................. 60/39.52, 782, 785, 39.5, 39.182
  See application file for complete search history.

(56) References Cited

U.S. PATENT DOCUMENTS 2,617,253 A * 11/1952 Fusner et al. .............. 60/39.091
5,669,365 A    9/1997 Gärtner et al.
(Continued)

FOREIGN PATENT DOCUMENTS

| DE | 195 24 603 C1 | 8/1996 |
| EP | 2 060 772 A2 | 5/2009 |
| EP | 2 218 889 A2 | 8/2010 |
| JP | 62-101843 A | 5/1987 |

(Continued)

OTHER PUBLICATIONS

International Search Report (PCT/ISA/210) issued on Oct. 18, 2011, by the European Patent Office as the International Searching Authority for International Application No. PCT/EP2011/063690.

(Continued)

*Primary Examiner* — William H Rodriguez
*Assistant Examiner* — Carlos A Rivera
(74) *Attorney, Agent, or Firm* — Buchanan Ingersoll & Rooney PC

(57) ABSTRACT

A method and gas turbine are provided for the reliable purging of an exhaust gas recirculation line of the gas turbine with exhaust gas recirculation without the use of additional blow-off fans. A blow-off flow of the compressor is used for the purging of the exhaust gas recirculation line. The gas turbine can include at least one purging line which connects a compressor blow-off point to the exhaust gas recirculation line.

24 Claims, 2 Drawing Sheets

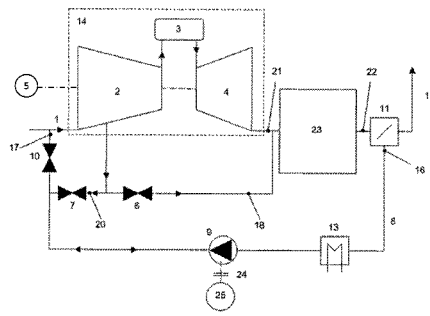

LEGEND
1. Compressor Intake Flow
2. Compressor
3. Combustion Chamber
4. Turbine
5. Generator
6. First Blow-Off Valve
7. Purge Valve
8. Exhaust Gas Recirculation Line
9. Recirculation Fan
10. Control Element
11. Flow Splitter
12. Exhaust Stack/Line for $CO_2$ Separation
13. Exhaust Gas Recirculation Cooler
14. Gas Turbine
16. First End
17. Second End
18. First Blow-Off Line
20. Purging Line
21. Exhaust Gas Duct
22. Exhaust Gas Duct
23. Heat Recovery Steam Generator (HRSG)
24. Clutch
25. Drive

(56) References Cited

U.S. PATENT DOCUMENTS

| | | |
|---|---|---|
| 7,866,140 B2 * | 1/2011 | Chillar et al. ............ 60/39.52 |
| 2009/0104020 A1 * | 4/2009 | Roush et al. ............ 415/145 |
| 2009/0120089 A1 * | 5/2009 | Chillar et al. ............ 60/605.2 |
| 2009/0129914 A1 * | 5/2009 | Simpson ............ 415/11 |
| 2010/0031624 A1 * | 2/2010 | Austin et al. ............ 60/39.5 |
| 2010/0205967 A1 | 8/2010 | Gopalkrishna et al. |
| 2010/0251727 A1 | 10/2010 | Myers et al. |
| 2011/0302922 A1 * | 12/2011 | Li et al. ............ 60/645 |

FOREIGN PATENT DOCUMENTS

| | | |
|---|---|---|
| WO | WO 2008/123904 A2 | 10/2008 |
| WO | WO 2010/072710 A2 | 7/2010 |

OTHER PUBLICATIONS

Written Opinion (PCT/ISA/237) issued on Oct. 18, 2011, by the European Patent Office as the International Searching Authority for International Application No. PCT/EP2011/063690.

* cited by examiner

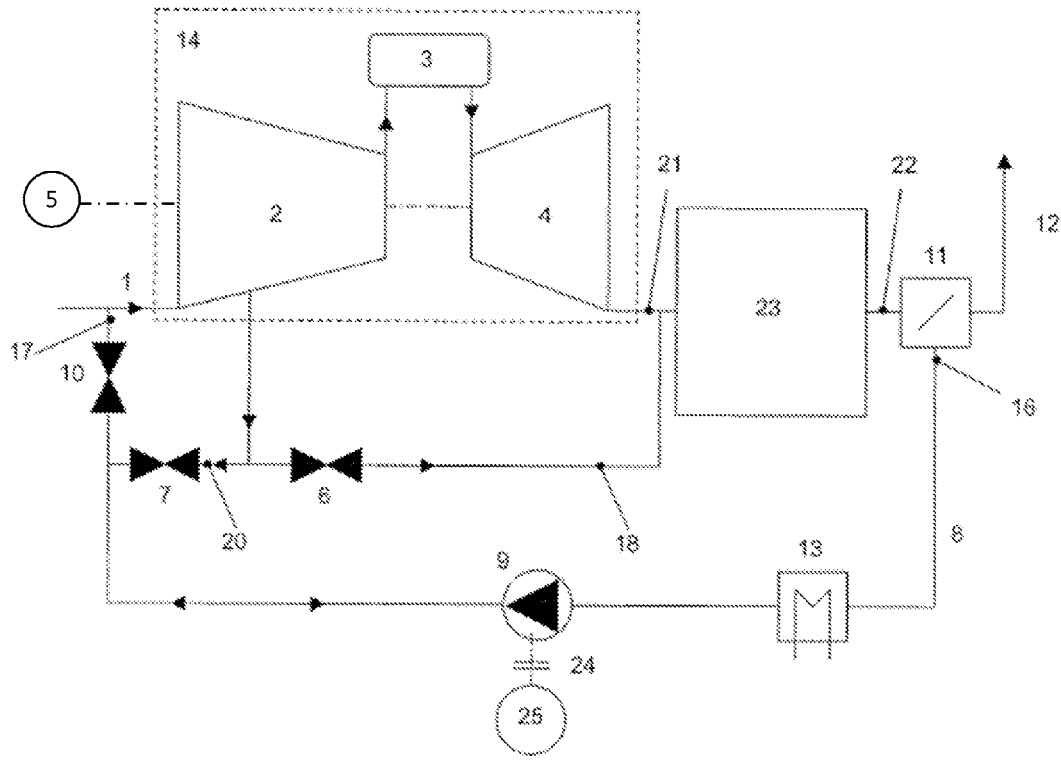

Fig. 1

LEGEND

1. Compressor Intake Flow
2. Compressor
3. Combustion Chamber
4. Turbine
5. Generator
6. First Blow-Off Valve
7. Purge Valve
8. Exhaust Gas Recirculation Line
9. Recirculation Fan
10. Control Element
11. Flow Splitter
12. Exhaust Stack/Line for $CO_2$ Separation
13. Exhaust Gas Recirculation Cooler
14. Gas Turbine
16. First End
17. Second End
18. First Blow-Off Line
20. Purging Line
21. Exhaust Gas Duct
22. Exhaust Gas Duct
23. Heat Recovery Steam Generator (HRSG)
24. Clutch
25. Drive

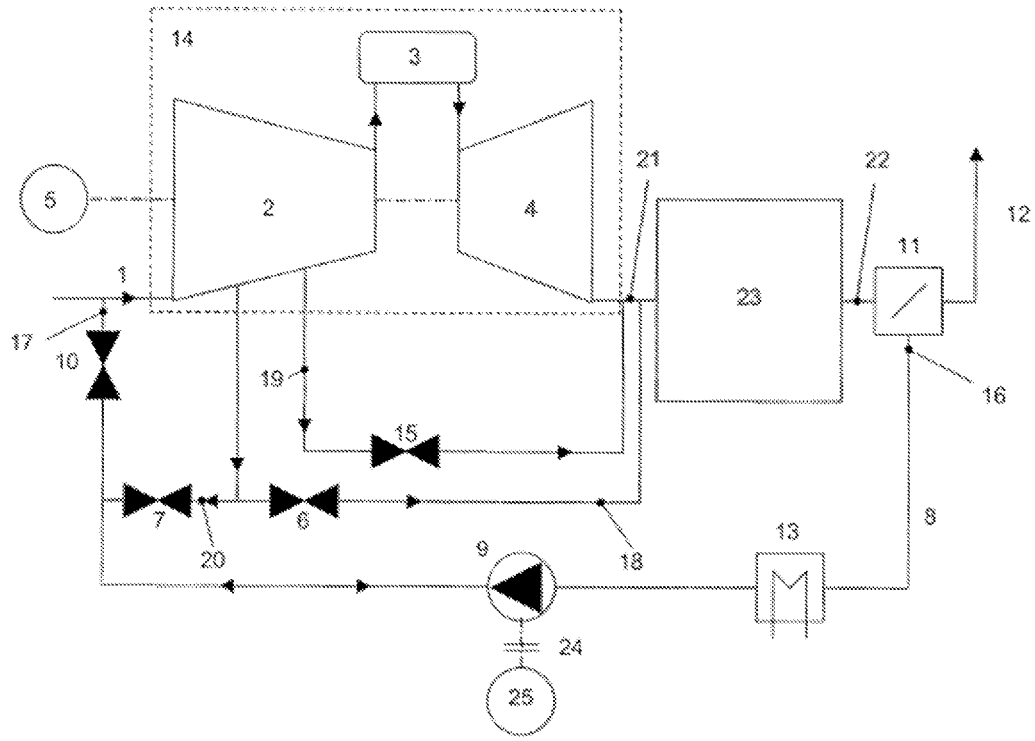

Fig. 2

LEGEND

1. Compressor Intake Flow
2. Compressor
3. Combustion Chamber
4. Turbine
5. Generator
6. First Blow-Off Valve
7. Purge Valve
8. Exhaust Gas Recirculation Line
9. Recirculation Fan
10. Control Element
11. Flow Splitter
12. Exhaust Stack/Line for $CO_2$ Separation
13. Exhaust Gas Recirculation Cooler
14. Gas Turbine
15. Second Blow-Off Valve
16. First End
17. Second End
18. First Blow-Off Line
19. Second Blow-Off Line
20. Purging Line
21. Exhaust Gas Duct
22. Exhaust Gas Duct
23. Heat Recovery Steam Generator (HRSG)
24. Clutch
25. Drive

FLUSHING THE EXHAUST GAS RECIRCULATION LINES OF A GAS TURBINE

RELATED APPLICATIONS

This application claims priority as a continuation application under 35 U.S.C. §120 to PCT/EP2011/063690, which was filed as an International Application on Aug. 9, 2011 designating the U.S., and which claims priority to Swiss Application 01424/10 filed in Switzerland on Sep. 2, 2010. The entire contents of these applications are hereby incorporated by reference in their entireties.

FIELD

The present disclosure relates to the purging of an exhaust gas recirculation line of a gas turbine having exhaust gas recirculation. More particularly, the present disclosure relates a method for the purging of the exhaust gas recirculation line, and to a gas turbine for implementing the method.

BACKGROUND INFORMATION

In order to reduce power losses and efficiency losses of gas turbines and combined cycle power plants with carbon dioxide separation, various ways have been proposed of increasing the carbon dioxide partial pressure before separation.

Exhaust gas recirculation is a technology which can be used for different purposes in gas turbines. Thus, it can be used for controlling the NOx emission by the provision of an intake gas with reduced reactivity, for example, that is to say usually with oxygen content which is reduced compared with fresh air, or used for reducing the exhaust gas volume for the carbon dioxide separation. During exhaust gas recirculation in a gas turbine, a significant proportion of the exhaust gas is branched from the overall exhaust gas flow and, for example, after cooling and, if necessary, after scrubbing, is fed again to the intake mass flow of the turbine or of the compressor of the gas turbine. To this end, the recirculated exhaust gas flow is mixed with fresh air and this mixture is then fed to the compressor. A corresponding power plant with a gas turbine and exhaust gas recirculation is known from WO2010/072710, for example.

In an HRSG (heat recovery steam generator or waste heat boiler) and in exhaust gas ducts downstream of the gas turbine, fuel residues can accumulate when the plant is being shut down. These fuel residues are removed from the volumes in question by means of so-called boiler purging before a restart of the plant. The aim of this safety measure is to free the exhaust gas ducts and the HRSG of residual fuels and explosive gas mixtures and to avoid potential explosions during startup. The boiler purging is carried out by driving the shaft train, by means of a starting device, at a low speed and with a low mass flow, as a result of which residual fuels are driven out of the plant via the exhaust stack.

In the case of gas turbines with exhaust gas recirculation, residual fuels can also accumulate in the exhaust gas recirculation lines and auxiliary systems, such as recirculation coolers, water separators, etc., of the exhaust gas recirculation system when the plant is being shut down. Before a restart, or before these lines and auxiliary systems are accessible for inspection or repair, these must also be purged, for example with fresh air.

The exhaust gas recirculation lines may be purged opposite to the flow direction during normal operation. Therefore, the purge air can be discharged via the normal exhaust stack. It is ensured, moreover, that combustible gas residues which possibly exist do not find their way from the boiler into the exhaust gas recirculation lines, which would result in the purging duration having to be further extended or even a cycle having to be created.

A system and method for the purging of exhaust gas recirculation lines are proposed in EP2060772. Additional flaps and, for example, an additional fan are proposed in EP2060772 for exhaust gas recirculation to allow the exhaust gas recirculation line to be purged. The large number of flaps and the additional fan lead to increased costs and increased power demand during the purging process, as a result of which the competitiveness of such plants with $CO_2$ separation can be compromised.

SUMMARY

An exemplary embodiment of the present disclosure provides a method for the purging of an exhaust gas recirculation line of a gas turbine including a compressor. The exemplary method includes operating the gas turbine at a purging speed, discharging blow-off air from the compressor, and introducing the blow-off air into the exhaust gas recirculation line for purging.

An exemplary embodiment of the present disclosure provides a gas turbine which includes an exhaust gas duct, and a compressor intake duct having a compressor intake flow. In addition, the exemplary gas turbine includes an exhaust gas recirculation line connecting the exhaust gas duct of the gas turbine to the compressor intake duct for recirculation of exhaust gases into the compressor intake flow. The exemplary gas turbine also includes at least one purging line leading from a compressor blow-off point into the exhaust gas recirculation line.

BRIEF DESCRIPTION OF THE DRAWINGS

Additional refinements, advantages and features of the present disclosure are described in more detail below with reference to exemplary embodiments illustrated in the drawings, in which:

FIG. 1 shows a gas turbine with HRSG and exhaust gas recirculation, with a blow-off line into the exhaust gas recirculation line for the purging of the exhaust gas recirculation lines, according to an exemplary embodiment of the present disclosure; and FIG. 2 shows a gas turbine with HRSG and exhaust gas recirculation, with a blow-off line into the exhaust gas recirculation line for the purging of the exhaust gas recirculation lines and of a blow-off line to the HRSG, according to an exemplary embodiment of the present disclosure.

DETAILED DESCRIPTION

Exemplary embodiments of the present disclosure provide a method which allows for the reliable purging of the exhaust gas recirculation lines without the use of additional blowdown fans. Exemplary embodiments of the present disclosure also provide a gas turbine which is suitable for carrying out the reliable purging of the exhaust gas recirculation lines without the use of additional fans. In this case, the number of additional flaps, valves and pipes is to be minimized, moreover.

An exemplary embodiment of the present disclosure provides a method for the purging of an exhaust gas recirculation line of a gas turbine including a compressor. The exemplary method includes operating the gas turbine at a purging speed, discharging blow-off air from the compressor, and introducing the blow-off air into the exhaust gas recirculation line for purging. In addition, an exemplary embodiment of the present disclosure provides a gas turbine which includes an exhaust gas duct, and a compressor intake duct having a compressor intake flow. In addition, the exemplary gas turbine includes an exhaust gas recirculation line connecting the exhaust gas duct of the gas turbine to the compressor intake duct for recirculation of exhaust gases into the compressor intake flow. The exemplary gas turbine also includes at least one purging line leading from a compressor blow-off point into the exhaust gas recirculation line. The exemplary embodiments according to the present disclosure are characterized in that a blow-off flow of the compressor is used for the purging of the exhaust gas recirculation line.

During operation of a compressor at rotational speeds which lie appreciably below the nominal rotational speed (stationary up to about 20% below the nominal rotational speed), for example, during startup, shutting down and boiler purging, a portion of the air inducted by the compressor has to be blown off. For this, partially compressed air is released from the compressor via plena and, for example, blown off directly into the environment or directed via lines into the exhaust gas duct of the gas turbine and blown off via the exhaust stack.

For boiler purging, a gas turbine may be operated at rotational speeds which lie appreciably below the nominal rotational speed. That is to say, the gas turbines are operated within a rotational speed range in which air is blown off from the compressor. This is a range of 20% to 50% of the nominal rotational speed, for example, wherein in the case of large gas turbines the nominal rotational speed is equal to the mains frequency. For boiler purging, the generator, generally with the aid of a frequency converter, for example, a so-called SFC (static frequency converter), is operated as a motor which drives the gas turbine.

Depending upon the compressor design and rotational speed, a large portion of the compressor intake flow is blown off via the blow-off valves during boiler purging. The amount blown off can be up to 60%—in some cases even more—of the compressor intake flow. The mass flow to be blown off may be proportional to the pressure ratio of the compressor during full-load operation and the compressor intake flow is proportional to the rotational speed at which the mass flow is blown off. Since the pressure in the plena of the compressor lies above the ambient pressure, this mass flow can be used wholly or partially for purging the exhaust gas recirculation lines. For this, at least one connecting line with a control element is provided from a compressor plenum to the exhaust gas recirculation line.

In accordance with an exemplary embodiment, the blow-off air is introduced into an end region of the exhaust gas recirculation line and discharged at another end of the exhaust gas recirculation line. For practical reasons, it may be difficult to introduce the blow-off air directly into the end of the exhaust gas recirculation line. An introduction in the end region, for example, into a section which is at a distance of at most 10 to 20% away from the one end of the line, is provided in order to avoid larger dead spaces at the end of a line and to ensure a clearly defined flow direction.

In accordance with an exemplary embodiment, the blow-off air is introduced at a second end of the exhaust gas recirculation line, which opens into the intake duct of the compressor of the gas turbine. From there, the blow-off air flows through the exhaust gas recirculation line opposite to the direction of the recirculation flow during normal operation of the gas turbine and is discharged at a first end of the exhaust gas recirculation line. The first end of the exhaust gas recirculation line is the end at which the exhaust gas recirculation line is connected to an exhaust gas duct of the gas turbine. This connection is combined with a control element, such as a control flap, for example.

During purging, after flowing through the exhaust gas recirculation line, the blow-off air is directed from the first end of the exhaust gas recirculation line directly or indirectly into the exhaust stack.

The flow of blow-off air from the recirculation line into the intake flow of the compressor is controlled by means of a control element which is arranged between the place at which the blow-off air enters the exhaust gas recirculation line and a second end of the exhaust gas recirculation line. This control element may be a flap or a valve, for example.

This control element also allows adjustment of the ratio of the blow-off air which flows to the second end of the exhaust gas recirculation line and the blow-off air which flows to the first end of the exhaust gas recirculation line. For example, for a short time blow-off air is purged through the second end of the exhaust gas recirculation line into the compressor intake duct and then purges the exhaust gas recirculation line in the direction of the first end. A time period of several seconds up to a few minutes is to be understood in this case as a short time, for example, about a tenth up to a fifth of the boiler purging time.

In accordance with an exemplary embodiment, a first portion of the blow-off air is introduced into the exhaust gas recirculation line for purging, and a second portion of the blow-off air is fed via a blow-off line to exhaust gas ducts and, for example, to the HRSG.

In accordance with an exemplary embodiment, blow-off air from a first blow-off point of the compressor is introduced into the exhaust gas recirculation line for purging, and blow-off air from a second blow-off point of the compressor is fed via a blow-off line to the exhaust gas ducts and therefore to the HRSG, for example.

In addition to the method, exemplary embodiments of the present disclosure also provide a gas turbine with recirculation, which allows the purging of the exhaust gas recirculation line by means of compressor blow-off air.

In accordance with an exemplary embodiment, a gas turbine according to the present disclosure includes an exhaust gas recirculation line, which connects an exhaust gas duct of the gas turbine to the compressor intake duct for recirculation of exhaust gases into the compressor intake flow, and at least one purging line which connects a compressor blow-off point to the exhaust gas recirculation line.

In accordance with an exemplary embodiment, the purging line may include a purge valve for controlling the purging mass flow. The purging valve allows for the control of the blow-off flow with which the exhaust gas recirculation line is purged by means of blow-off air. This purge valve can be arranged in series with known blow-off valves or replace such blow-of valves and their function. In other words, the purge valve can undertake the closing of the blow-off facility during normal operation of the gas turbine and the opening of the blow-off facility for starting and shutting down of the gas turbine.

In addition, a blow-off line can connect the compressor blow-off point—to which the purging line is connected—to the exhaust gas duct of the gas turbine. This allows for a portion of the blow-off air to be used for back-purging of the exhaust gas recirculation line and allows for the other portion to be routed through the blow-off line into the exhaust gas duct. In addition, gases under high pressure and at high temperature from the compressor can therefore be prevented from finding their way into the exhaust gas recirculation lines during a shutdown of the gas turbine or during a turbine trip. In this case, the purge valve remains closed and the blow-off valve is opened as in the case of a known gas turbine when being shut down. It can also be advantageous during startup to close the purge valve after purging and to blow off the blow-off air only via the blow-off line during ramp up. In order to control the blow-off facility separately, a blow-off valve is arranged in the blow-off line in accordance with an exemplary embodiment.

In accordance with an exemplary embodiment, there can be provided at least one second blow-off line from a second compressor blow-off point which connects this to the exhaust gas duct of the gas turbine.

In the exhaust gas recirculation line of a gas turbine with exhaust gas recirculation, there may be arranged a recirculation fan which assists the recirculation of the exhaust gases into the compressor intake flow. During the purging process, the flow direction is opposite to that of the normal operation, and the recirculation fan leads to an increased pressure drop. In order to avoid this additional pressure drop, the recirculation fan in one embodiment is connected to its drive via a clutch. This clutch allows the recirculation fan to be disconnected during the purging process so that it can freewheel opposite to its normal direction of rotation, and therefore its pressure loss is reduced.

In accordance with an exemplary embodiment, the recirculation fan is designed with variable geometry guide vanes and/or variable geometry impeller blades. These can be opened in order to reduce the flow resistance. Alternatively, they can be reset so that the recirculation fan operates opposite to its normal flow direction and assists the purging.

Large recirculation fans may be driven by means of a controllable motor. In accordance with an exemplary embodiment, the controlling facility allows the motor to be driven opposite to its normal direction of rotation so that the recirculation fan offers reduced flow resistance during the purging or assists the purging.

In accordance with an exemplary embodiment of the present disclosure, the purging process may be carried out by means of the recirculation fan. For the purging of the exhaust gas recirculation line, the variable geometry guide vanes and/or impeller blades are reset so that the recirculation fan operates opposite to its normal flow direction and therefore purges the exhaust gas recirculation lines opposite to the normal flow direction with air which is branched from the intake duct of the compressor. Alternatively, the motor of the recirculation fan can be driven in a controlled manner opposite to its normal direction of rotation so that the exhaust gas recirculation line is purged opposite to its normal direction of rotation with air which is branched from the intake duct of the compressor. For these embodiments, the purging line and blow-off facility from the compressor into the exhaust gas recirculation line can be dispensed with.

An exemplary embodiment of a gas turbine 14 with an HRSG and exhaust gas recirculation is shown schematically in FIG. 1. Also shown are the lines and control elements for blowing off compressor air into the exhaust gas recirculation line for the purging of this line.

The gas turbine includes a compressor 2, a combustion chamber 3 and a turbine 4. The combustion air which is compressed in the compressor 2 is fed to the combustion chamber 3 and combusted there, and the hot combustion gases are then expanded in the turbine 4. The useful energy which is produced in the turbine is converted by a generator 5, for example, which is arranged on the same shaft, into electric energy.

The exhaust gases which issue from the turbine 4, for optimum utilization of the energy still contained therein, are used in an HRSG 23 (heat recovery steam generator) or waste heat boiler for producing steam for a steam turbine or for other plants.

An intake flow 1 for the compressor 2 may be fed, for example, via an intake duct. Fresh intake air is directed in this case first of all via an air filter which is arranged at the inlet. Downstream of this air filter, silencers can be arranged in the feed duct of the compressor intake flow 1. The air feed with filter and silencers is subsequently referred to simply as the compressor intake duct.

In such a plant, a portion of the exhaust gases is introduced downstream of the HRSG 23 in a flow splitter 11—which can be controlled—into a first end 16 of an exhaust gas recirculation line 8 and, via this exhaust gas recirculation line 8, is recirculated into the compressor intake flow 1. For this, the recirculated exhaust gases flow from a second end 17 of the exhaust gas recirculation line 8 into the compressor intake flow 1, are mixed with the fresh intake air and are thus fed back to the intake side of the compressor 2. The portion of exhaust gases which is not branched off may be directed to a carbon dioxide separation unit or discharged to the environment via an exhaust stack 12.

The recirculated exhaust gas flow is cooled to just above ambient temperature in an exhaust gas recirculation cooler 13 or heat exchanger which can be equipped with a condenser. Arranged downstream of this exhaust gas recirculation cooler 13 can be a recirculation fan 9 which, for example, is driven by a drive 25 via a clutch 24. The drive 25 may be, for example, an electric motor.

During normal operation, the intake air is mixed with recirculated exhaust gases upstream of the compressor 2. In this case, a first blow-off valve 6 and a purge valve 7 are closed during normal operation. In addition, a control element 10, with which the outlet of the exhaust gas recirculation line 8 can be connected into the compressor intake duct, is opened.

In order to enable purging of the exhaust gas recirculation line 8, a purging line 20 is provided from a blow-off point of the compressor 2 to the second end 17 of the exhaust gas recirculation line 8. The purging line 20 does not lead directly into the second end of the exhaust gas recirculation line 8 but is isolated from the compressor intake duct by means of the control element 10. For controlling the purge flow itself, provision is made for a purge valve 7. Blowing off into the exhaust gas duct 21 of the gas turbine 14 is made possible by means of a first blow-off line 18. For controlling the blowing off into the exhaust gas duct 21, provision is made for a first blow-off valve 6.

For purging, the gas turbine 14 is brought up to purging speed. To this end, the gas turbine 14 may be driven by the generator 5 which is operated as a motor, for example. For the purging of the exhaust gas recirculation line 8, the purge valve 7 is opened. Via the purge valve 7, the blow-off air from the compressor 2 is blown through the exhaust gas recirculation line 8 into the exhaust stack 12 and thereby purges the exhaust gas recirculation lines 8. The control element 10 is closed at least for a part of the purging period in order to ensure that the blow-off air cannot flow into the compressor intake flow.

The first blow-off valve 6 allows a splitting of the blow-off flow into a portion with which the exhaust gas recirculation line is purged, and into a portion which is fed to the exhaust gas duct 21. In addition, the first blow-off valve 6 allows large quantities of hot air to be blown off, for example, in the event of a trip of the plant. If a blow-off is provided via the exhaust gas recirculation line 8, this should be designed for correspondingly hot air.

Depending upon the volume of the exhaust gas recirculation line 8 and of the blow-off air quantities, only a portion of the blow-off air is required for purging the exhaust gas recirculation line 8.

In accordance with an exemplary embodiment, the air from a first plenum, for example, downstream of the low-pressure section of a compressor 2, is used for the purging of the exhaust gas recirculation line 8. The air from a second plenum, for example, downstream of the intermediate-pressure section of a compressor 2, on the other hand is fed back, via a second blow-off valve 15 and a second blow-off line 19, directly to the exhaust gas duct 21 of the gas turbine 14. A corresponding arrangement is shown schematically in FIG. 2.

All the explained advantages are applicable not only in the respectively disclosed combinations but also in other combinations or in isolation without departing from the scope of the present disclosure. For example, instead of using blow-off air from one blow-off point, as is shown in FIGS. 1 and 2, the blow-off air from a plurality of blow-off points of the compressor 2 can be brought together and used for the purging of the exhaust gas recirculation line 8.

The controlling of valves or flaps is described in a simplified manner. This controlling is representative of closed-loop controlling or open-loop controlling. The various suitable control elements, such as flaps or valves, are also known to the person skilled in the art.

In accordance with an exemplary embodiment, a blow-off point of the compressor may be a point at which cooling air for the turbines and/or for combustion chamber cooling is also extracted from the compressor. The purging line 20 does not have to project directly from the compressor but can be branched from a known blow-off line or cooling air line. The examples show a gas turbine 14 with a single combustion chamber. The present disclosure is correspondingly applicable to gas turbines with sequential combustion, as are known from EP0718470, for example, the entire disclosure of which is incorporated herein by reference.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Compressor intake flow
2 Compressor
3 Combustion chamber
4 Turbine
5 Generator
6 First blow-off valve
7 Purge valve
8 Exhaust gas recirculation line
9 Recirculation fan
10 Control element
11 Flow splitter
12 Exhaust stack/line for CO2 separation
13 Exhaust gas recirculation cooler
14 Gas turbine
15 Second blow-off valve
16 First end
17 Second end
18 First blow-off line
19 Second blow-off line
20 Purging line
21, 22 Exhaust gas duct
23 HRSG
24 Clutch
25 Drive

What is claimed is:

1. A method for the purging of an exhaust gas recirculation line of a gas turbine including a compressor, the method comprising:
    operating the gas turbine at a purging speed;
    discharging blow-off air from the compressor; and
    introducing the blow-off air into the exhaust gas recirculation line for purging,
    wherein the introduction of the blow-off air includes:
        introducing the blow-off air into the exhaust gas recirculation line;
        directing a first partial flow of the blow-off air in a direction of a second end of the exhaust gas recirculation line; and
        directing a second partial flow of the blow-off air in a direction of a first end of the exhaust gas recirculation line.

2. The method as claimed in claim 1, comprising:
    discharging the blow-off air from the second end of the exhaust gas recirculation line.

3. The method as claimed in claim 1, wherein the introduction of the blow-off air includes:
    introducing the blow-off air at the second end of the exhaust gas recirculation line, which opens into an intake duct of the gas turbine;
    flowing the blow-off air through the exhaust gas recirculation line opposite to a direction of a recirculation flow during normal operation of the gas turbine; and
    discharging the blow-off air from the first end of the exhaust gas recirculation line.

4. The method as claimed in claim 3, wherein the blow-off air, after flowing through the exhaust gas recirculation line, is directed from the first end of the exhaust gas recirculation line directly or indirectly into an exhaust stack.

5. The method as claimed in claim 1, comprising:
    controlling, by a control element, a ratio of the blow-off air which flows to the second end of the exhaust gas recirculation line to the blow-off air which flows to the first end of the exhaust gas recirculation line.

6. The method as claimed in claim 1, comprising:
    introducing the first partial flow of the blow-off air into the exhaust gas recirculation line for purging; and
    feeding the second partial flow of the blow-off air via a second blow-off line to a heat recovery steam generator.

7. The method as claimed in claim 2, wherein the introduction of the blow-off air includes:
    introducing the blow-off air at the second end of the exhaust gas recirculation line, which opens into an intake duct of the gas turbine;
    flowing the blow-off air through the exhaust gas recirculation line opposite to a direction of a recirculation flow during normal operation of the gas turbine; and
    discharging the blow-off air from the first end of the exhaust gas recirculation line.

8. The method as claimed in claim 7, wherein the blow-off air, after flowing through the exhaust gas recirculation line, is directed from the first end of the exhaust gas recirculation line directly or indirectly into an exhaust stack.

9. The method as claimed in claim 1, wherein the gas turbine includes a generator,
wherein the operating of the gas turbine comprises operating the gas turbine at rotational speeds in a range of 20% to 50% of the nominal rotational speed of the gas turbine, and
wherein the generator is operated as a motor which drives the gas turbine and simultaneously purges the exhaust gas recirculation line with the blow-off air and a boiler with exhaust flow of the gas turbine.

10. The method as claimed in claim 1, wherein the introducing of the blow-off air into the exhaust gas recirculation line comprises introducing the blow-off air into a section of the exhaust gas recirculation line which is at most 10 to 20% away from an end of the exhaust gas recirculation line such that the blow-off air is not introduced into the end of the exhaust gas recirculation line.

11. The method as claimed in claim 1, comprising:
purging the exhaust gas recirculation line to a location in an exhaust gas duct downstream of a heat recovery steam generator (HRSG), which is downstream of the gas turbine; and
purging the HRSG with exit flow of the gas turbine.

12. The method as claimed in claim 1, comprising:
operating the compressor at rotational speeds which are above standstill of the compressor and 20% below a nominal rotational speed of the gas turbine.

13. The method as claimed in claim 1, comprising:
purging the blow-off air through the second end of the exhaust gas recirculation line into the compressor intake duct for a predetermined time; and
purging the exhaust gas recirculation line in the direction of the first end of the exhaust gas recirculation line.

14. The method as claimed in claim 13, wherein the predetermined time is in a time range of several seconds to several minutes.

15. A gas turbine comprising:
a compressor;
an exhaust gas duct;
a compressor intake duct having a compressor intake flow;
an exhaust gas recirculation line connecting the exhaust gas duct of the gas turbine to the compressor intake duct for recirculation of exhaust gases into the compressor intake flow;
at least one purging line leading from a compressor blow-off point into the exhaust gas recirculation line; and
a control element arranged in the exhaust gas recirculation line between a mouth of the purging line into the exhaust gas recirculation line and a mouth of the exhaust gas recirculation line into the compressor intake duct to at least one of control and prevent back-purging of blow-off air into compressor inlet flow,
wherein the compressor is configured to be operated at rotational speeds which are above standstill of the compressor and 20% below a nominal rotational speed of the gas turbine, and
wherein the control element is configured to control a ratio of the blow-off air which flows to the compressor inlet flow at a second end of the exhaust gas recirculation line to the blow-off air which flows to a first end of the exhaust gas recirculation line.

16. The gas turbine as claimed in claim 15, comprising:
a purge valve arranged in the purging line for controlling a purging mass flow with which the exhaust gas recirculation line is purged by blow-off air.

17. The gas turbine as claimed in claim 15, wherein the purging line is connected to the compressor blow-off point, and
wherein the gas turbine comprises a first blow-off line connecting the compressor blow-off point to the exhaust gas duct of the gas turbine.

18. The gas turbine as claimed in claim 17, comprising:
a first blow-off valve arranged in the first blow-off line.

19. The gas turbine as claimed in claim 15, comprising:
a second blow-off line connecting a second compressor blow-off point to the exhaust gas duct of the gas turbine.

20. The gas turbine as claimed in claim 15, comprising:
a recirculation fan having a drive and arranged in the exhaust gas recirculation line,
wherein the recirculation fan is arranged in a disconnectable manner to the drive so that during blow off, the recirculation fan is configured to freewheel opposite to a normal direction of rotation of the recirculation fan.

21. The gas turbine as claimed in claim 15, comprising:
a recirculation fan having at least one of variable geometry guide vanes and impeller blades, and being arranged in the exhaust gas recirculation line,
wherein a direction of rotation of the recirculation fan is reversible so that during the blow off the recirculation fan is configured to provide at least one of reduced flow resistance and assistance to the purging line.

22. The gas turbine as claimed in claim 15, comprising:
a generator,
wherein the gas turbine is configured to be operated at rotational speeds in a range of 20% to 50% of the nominal rotational speed of the gas turbine, and
wherein the generator is configured to be operated as a motor which drives the gas turbine and simultaneously purges the exhaust gas recirculation line with blow-off air and a boiler with exhaust flow of the gas turbine.

23. The gas turbine as claimed in claim 15, wherein the at least one purging line is configured to introduce blow-off air into a section of the exhaust gas recirculation line which is at most 10 to 20% away from an end of the exhaust gas recirculation line such that the blow-off air is not introduced into the end of the exhaust gas recirculation line.

24. The gas turbine as claimed in claim 15, wherein the exhaust gas duct is located downstream of a heat recovery steam generator (HRSG), which is downstream of the gas turbine, and
wherein the exhaust gas recirculation line is purged to a location in the exhaust gas duct, and the HRSG is purged with exit flow of the gas turbine.

* * * * *